United States Patent [19]

Herchenroeder

[11] 3,953,579

[45] Apr. 27, 1976

[54] METHODS OF MAKING REACTIVE METAL SILICIDE

[75] Inventor: Robert B. Herchenroeder, Kokomo, Ind.

[73] Assignee: Cabot Corporation, Kokomo, Ind.

[22] Filed: July 2, 1974

[21] Appl. No.: 485,117

[52] U.S. Cl. ............................. 423/263; 423/344; 75/10 R; 75/152
[51] Int. Cl.² ..................................... C01F 17/00
[58] Field of Search ........... 423/263, 344; 75/134 S, 75/152, 10 R

[56] References Cited
UNITED STATES PATENTS

| | | | |
|---|---|---|---|
| 3,250,609 | 5/1966 | Bungardt et al. ..................... | 75/152 |
| 3,264,093 | 8/1966 | Sump ..................................... | 75/152 |
| 3,326,637 | 6/1967 | Holtzberg et al. ..................... | 75/152 |
| 3,332,741 | 7/1967 | Teatum ................................. | 423/344 |
| 3,364,015 | 1/1968 | Sump ..................................... | 75/152 |
| 3,440,040 | 4/1969 | Kallenbach et al. ................... | 75/152 |
| 3,440,041 | 4/1969 | Kallenbach et al. ................... | 75/152 |
| 3,539,334 | 11/1970 | Goeddel et al. ...................... | 75/152 |

OTHER PUBLICATIONS

Perri et al., "Journal of Physical Chem." Vol. 63, 1959, pp. 616–619.
Duckworth et al., "Electro-slag Refining," Chapman & Hall, Ltd., London, 1969.

*Primary Examiner*—Herbert T. Carter
*Attorney, Agent, or Firm*—Buell, Blenko, and Ziesenheim

[57] ABSTRACT

A method is provided for making reactive metal silicide, particularly for use in adding lanthanum or other reactive metals to metal melts, by reacting reactive metal oxide with a metal silicide or silicon in an ESR furnace.

12 Claims, No Drawings

METHODS OF MAKING REACTIVE METAL SILICIDE

This invention relates to methods of making reactive metal silicide and particularly to methods of making master alloys of lanthanum and silicon, and of other reactive metals and silicon.

Lanthanum, which is commonly classified along with the rare earth elements cerium and praesodimium of the lanthanide metals series, and yttrium of the yttrium metals series have characteristics which impart unique properties to alloys to which they are added. Likewise, misch metal silicides or misch metal silicon alloys are frequently added to steels and other alloys for deoxidation and for control of sulfur. As a result it is desirable to be able to provide a source of these reactive metals for addition to metal melts. In the past, these reactive elements, lanthanum, the other rare earth or misch metal elements, and yttrium have been produced as relatively pure elements, mixtures of the reactive elements (misch metal), or as alloys of nickel, cobalt, iron, for example. The pure elements are expensive as are alloys made from pure reactive metal elements melted with nickel, cobalt, etc. Lanthanum silicon and other reactive metal silicon master alloys are a highly satisfactory sources of lanthanum and reactive metals, however, the methods proposed for producing rare earth silicides do not produce satisfactory economical silicon alloy. Typical of the prior art methods of producing rare earth silicon alloys are those disclosed by Perri et al., Journal of Physical Chemistry, Vol. 63, 1959 and in U.S. Pat. Nos. 3,250,609; 3,440,041 and 3,537,844. In those patents a mixture of rare earth oxides and metal silicides is heated to promote a reaction to form metal oxide slag and a rare earth-silicon alloy. Calcium carbide and iron are added to improve the reaction. Unfortunately these techniques are not satisfactory for producing lanthanum-silicon alloy with any degree of efficiency and economy. If the reactants are simply blended and heated to a temperature adequate to cause the reaction between the reactive metal oxides and silicon or silicon alloy to occur but insufficiently high to obtain a fluid slag the resulting reactive metal-silicon alloy is so intermingled with the slag product as to require an ore dressing operation to recover the alloy.

If the reactants are heated sufficiently to cause a fluid slag so that a liquid-liquid partition occurs there are undesirable reactions with the normal reaction vessels such as carbon, or ceramics.

When reacted in a direct arc electric furnace, a relatively large starting pool of nickel or other metallic is required thus causing dilution of the resultant metal silicon alloy and an undesirable low concentration of the reactive metal.

I have found that highly efficient and relatively inexpensive reactive metal master alloys with silicon can be produced by a modified electro-slag refining technique. By the process of my invention, a reactive metal silicon alloy can be provided which is clearly separated from the slag components without need for further cleaning operations and which can be used directly as an additive in metal making operations.

Further, because the reaction vessel is a water cooled crucible usually constructed of copper, there is no reaction with the crucible and no contamination of the product. Because of the intensity of the heat source in a furnace of the electroslag remelting type the slags are easier to control and the process is efficient. In addition, there is no need to establish a large starting pool of undesirable metallic.

Preferably, I feed a mixture of reactive metal oxide and metal silicide or silicon into a slag pool formed between a non consumable electrode and the base of a water cooled crucible to form a pool of reactive metal-silicon alloy covered with slag, raising the electrode as the molten bath rises in the container, to permit the reactive metal-silicon alloy to solidify beneath the slag and then separate the slag and lanthanum silicon alloy. Preferably the metal silicide is from the group, calcium, aluminum, zirconium, and like strong oxide formers. Iron, nickel, cobalt, or other elements which have less of an affinity for oxygen than silicon are to be avoided. Iron, nickel, and cobalt tend to participate in the reaction so that an $(Fe,La)Si_2$ compound, for example, is formed. This decreases efficiency and allows a concentration of only about 35–40 percent reactive metal, whereas in the process of the invention concentrations of reactive metal greater than 50 percent is common. A slag flux such as fluorspar may be added to maintain the slag in fluid condition throughout the melting operation. Preferably the electrode is carbon and the container is a water cooled copper crucible. A nickel or other small starting pad is often used to protect the base of the crucible.

The invention can perhaps best be understood by reference to comparative test runs using prior art techniques and the techniques of this invention.

EXAMPLE I

A reaction boat was charged with a mixture made up of 92 grams of lanthanum oxide ($La_2O_3$) and 60 grams of Ca-Si alloy in which the ratio was 35Ca-65Si. This mixture was heated in a gas fired furnace for 1 hour at 2200°F (1204°C) to react the mixture as generally described in prior art processes for forming mixed rare earth silicon alloys.

At the end of the period the reaction was cooled and examined. It was found that $LaSi_2$ was formed in a fused oxide slag. Unfortunately the $LaSi_2$ was mixed as small particles in the slag and a mineral dressing operation would be required to separate the two. This proved to be a completely unsatisfactory method of making $LaSi_2$.

EXAMPLE II

In view of the fact that there was no separation between the $LaSi_2$ and the resultant oxide slag of Example I, a mixture was prepared in which silicon and $Na_2Co_3$ were added to assist in the formation of a more fluid slag in an effort to cause separation of $LaSi_2$ and the slag. A mixture of the following composition was prepared: 15 lbs. $La_2O_3$, 2.14 lbs. 35Ca-65Si alloy, 7.11 lbs. Si, and 0.9 lbs. of $Na_2O_3$. This was designed to provide a slag having a low melting point of about 2192°F (1200°C). A portion of this mixture was placed in a carbon susceptor in an induction furnace and heated cause the mixture to unite. Again, however, the $LaSi_2$ was intermingled throughout the slag as in Example I.

EXAMPLE III

A portion of the mixture from Example II was placed in an ESR unit using a nickel electrode operated at a power low enough to prevent consumption of the electrode. A fully molten slag was not formed and the prod-

EXAMPLE IV

Fifteen pounds of $La_2O_3$ were mixed with 14 lbs. of 35Ca-65Si alloy and added slowly to a 6 inch diameter water cooled copper crucible forming a part of an ESR unit having a non-consumable 4 inch diameter carbon electrode and a 1.2 lb. starting nickel pad for striking the arc. A small amount of $CaF_2$ was periodically added to the crucible for a total addition of 4¾ lbs. The melting of the mixture ran smoothly and a very fluid slag was formed.

After completion the carbon electrode was weighed and found to be substantially the same as its starting weight. The slag floated on top of the metallic portion and after solidification was easily removed and separated from the metallic. The slag weight was 9½ lbs. and the metallics 23½ lbs. X-ray diffraction showed the metallics to be predominantly $LaSi_2$. Chemical analysis showed the following:

| C | Ca | La | Ni | Si | Total |
|---|---|---|---|---|---|
| 0.10 | 5.58 | 50.40 | 0.25 | 35.32 | 91.75% |

The cost analysis showed a final cost of $5.82/lb. of contained La as compared with a price of $22.00/lb. being currently paid. This is obviously a remarkably lower cost for additive lanthanum.

EXAMPLE V

Forty lbs. of $La_2O_3$ were blended with 36 lbs. of a 35Ca-65Si alloy and 4.8 lbs. of $CaF_2$ (a flux). A 2.5 lb. starting pad was placed in the bottom of a nominally 8 inch diameter water cooled copper crucible of an electro-slag remelting furnace, equipped with a 6 inch diameter graphite electrode. Five lbs. of $CaF_2$ and 0.4 lbs. of the Ca-Si alloy were used to form a starting fluid pool into which the blend was fed. Power input was adjusted to maintain a fluid pool during the operation. After completion of the run 61.6 lbs. of metallic were recovered which contained 52.89 percent lanthanum, 5.37 percent calcium, and 32.70 percent silicon. Suspected impurities were iron, aluminum, impurities from the commercial Ca-Si used and nickel from the starting pool. Calculated recovery of lanthanum from $La_2O_3$ was 96 percent. Estimated cost per lb. of contained La was $5.00.

EXAMPLE VI

Fifteen lbs. of $Y_2O_3$ were blended with 19.5 lbs. of 35 Ca-65 Si alloy, and 2.5 lbs. of $CaF_2$. These were reacted in a 6 inch diameter water cooled copper crucible of an ESR furnace using a 4 inch diameter non consumable graphite electrode in a manner similar to that of Example V. After completion of the melting the metallics were recovered and found to contain 32.86% yttrium, 2.30% calcium and 45.46% silicon and tramp elements of Fe, Cr, Ni, Co, and manganese from the alloy starting pad.

uct was unsatisfactory.

In the foregoing specification, I have described certain preferred practices of my invention, however, it will be understood that this invention may be otherwise embodied within the scope of the following claims.

I claim:

1. A method of making lanthanum silicide comprising the steps of reducing a mixture of lanthanum oxide with at least a stoichiometric amount of metal silicide in which the metal has a stronger affinity for oxygen than silicon has in an electro-slag refining furnace having a cooled metal crucible using a non-consumable electrode having one end immersed in a molten oxide slag over said mixture and separating the resulting oxide slag and alloy.

2. A method as claimed in claim 1 wherein a slag fluxing agent is added to the furnace during melting.

3. A method as claimed in claim 2 wherein the fluxing agent is fluorspar and the electrode is carbon.

4. A method as claimed in claim 1 wherein the metal silicide is a silicide selected from the group consisting of Ca, Al, and Zr.

5. A method of making a lanthanum silicon master alloy comprising the steps of:
   a. feeding a mixture of lanthanum oxide and metal silicide in which the metal has a stronger affinity for oxygen than has silicon into a slag pool formed between a non consumable electrode having an end immersed in said pool and the base in a cooled metal container for a molten melt in the form of an electro-slag refining unit to form lanthanum-silicon alloy and slag,
   b. continuing to add said mixture of lanthanum oxide and metal silicide as the mixture melts in the container,
   c. raising the electrode as the molten bath rises in the container to permit lanthanum-silicon alloy to solidify beneath the slag and
   d. separating slag from the lanthanum-silicon alloy.

6. A method as claimed in claim 5 wherein a slag fluidizing agent is added to the furnace during melting.

7. A method as claimed in claim 6 wherein the fluidizing agent is fluorspar.

8. A method as claimed in claim 5 wherein the electrode is carbon.

9. A method as claimed in claim 5 wherein the metal silicide is one selected from the group consisting of Ca, Al, and Zr silicides and mixtures thereof.

10. A method of making rare earth metal silicides comprising the steps of reacting rare earth metal oxides with at least a stoichiometric amount of metal silicide in which the metal has a stronger affinity for oxygen than silicon has in an electro-slag refining furnace having a cooled metal crucible using a non consumable electrode having an end immersed in a molten slag over said mixture and separating the resulting oxide slag and alloy.

11. A method as claimed in claim 10 wherein the reactive metal oxide is yttrium oxide.

12. A method as claimed in claim 10 wherein the reactive metal oxide is cerium oxide.

* * * * *